US010460318B2

(12) United States Patent
Carraway et al.

(10) Patent No.: US 10,460,318 B2
(45) Date of Patent: Oct. 29, 2019

(54) EVENT NOTIFICATIONS FOR MULTIPLE SERVICES

(71) Applicant: AT&T Intellectual Property I, L.P., Atlanta, GA (US)

(72) Inventors: Precia Carraway, College Park, GA (US); Robert D. Garskof, Northford, CT (US); Jay O. Glasgow, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 773 days.

(21) Appl. No.: 14/943,585

(22) Filed: Nov. 17, 2015

(65) Prior Publication Data

US 2017/0140376 A1   May 18, 2017

(51) Int. Cl.
*G06Q 20/40*   (2012.01)
*H04L 29/08*   (2006.01)
(Continued)

(52) U.S. Cl.
CPC ....... *G06Q 20/401* (2013.01); *G06Q 20/3224* (2013.01); *G06Q 20/40145* (2013.01);
(Continued)

(58) Field of Classification Search
CPC .... G06Q 20/10; G06Q 20/3226; G06Q 20/40; G06Q 20/4012; G06Q 20/405;
(Continued)

(56) References Cited

U.S. PATENT DOCUMENTS 6,292,825 B1 * 9/2001 Chang ................ H04L 12/1859
  709/206
6,337,981 B1 * 1/2002 Peters ............... H04M 3/42229
  455/432.3
(Continued)

FOREIGN PATENT DOCUMENTS

WO   WO 2011/147940       * 12/2011   ............. H04L 12/58
WO   WO-2011/147940      * 12/2011   ............. H04L 12/58
WO   WO-2011147940 A1 * 12/2011   ............. H04L 51/12

OTHER PUBLICATIONS

QCamPRO: Enable event notification for your device, Feb. 12, 2015, pp. 1-4. (Year: 2015).*

(Continued)

*Primary Examiner* — Bijendra K Shrestha

(57) ABSTRACT

Methods, computer-readable storage media and apparatuses for processing event notifications are disclosed. For example, a processor receives an event notification of an event from a device of a service provider that is providing a service to a user, wherein the network service provider is distinct from the service provider, determines that the service provider and the event are of a type of service provider and a type of event, respectively, that the user has consented to receive the event notification, sends a message in a unified message format to a device of the user, the message comprising the event, receives a response from the device of the user containing an indication of whether the event is an authorized event, and sends the indication of whether the event is an authorized event to the device of the service provider.

20 Claims, 5 Drawing Sheets

(51) Int. Cl.
*H04L 12/58* (2006.01)
*G06Q 20/32* (2012.01)
*G06Q 20/42* (2012.01)

(52) U.S. Cl.
CPC ............. *G06Q 20/42* (2013.01); *H04L 51/24* (2013.01); *H04L 51/36* (2013.01); *H04L 67/18* (2013.01); *H04L 67/20* (2013.01); *H04L 51/32* (2013.01)

(58) Field of Classification Search
CPC ................ G06Q 20/401; G06Q 20/42; G06Q 20/40145; G06Q 20/3224; H04L 51/24; H04L 67/18; H04L 67/20; H04L 51/36; H04L 51/32
See application file for complete search history.

(56) References Cited

U.S. PATENT DOCUMENTS

| | | | |
|---|---|---|---|
| 6,943,682 B1 | 9/2005 | Dowens et al. | |
| 7,711,783 B1* | 5/2010 | Violleau | H04L 63/101 709/206 |
| 8,026,804 B2 | 9/2011 | Wu et al. | |
| 8,291,342 B2* | 10/2012 | Hassan | G06F 21/629 715/804 |
| 8,624,720 B2 | 1/2014 | Bajpay et al. | |
| 8,996,665 B2 | 3/2015 | Baum et al. | |
| 9,077,747 B1 | 7/2015 | Chen et al. | |
| 9,129,086 B2 | 9/2015 | Betz et al. | |
| 9,665,854 B1* | 5/2017 | Burger | G06Q 40/025 |
| 9,672,483 B2* | 6/2017 | Chae | G06Q 10/1093 |
| 2002/0143664 A1* | 10/2002 | Webb | G06Q 10/109 705/14.5 |
| 2003/0002634 A1* | 1/2003 | Gupta | H04L 51/36 379/88.13 |
| 2004/0243430 A1* | 12/2004 | Horstemeyer | B60R 25/102 340/928 |
| 2011/0238755 A1 | 9/2011 | Khan et al. | |
| 2012/0313774 A1 | 12/2012 | Sivakumar et al. | |
| 2013/0030934 A1 | 1/2013 | Bakshi et al. | |
| 2014/0267079 A1* | 9/2014 | Duplan | G06F 3/04883 345/173 |
| 2014/0273978 A1* | 9/2014 | Van Snellenberg | H04W 4/14 455/412.2 |
| 2014/0274122 A1 | 9/2014 | Tseng et al. | |
| 2015/0061859 A1 | 3/2015 | Matsuoka et al. | |
| 2015/0142595 A1* | 5/2015 | Acuna-Rohter | G06Q 20/40 705/21 |
| 2015/0161875 A1 | 6/2015 | Cohn et al. | |
| 2015/0180723 A1 | 6/2015 | Kuo et al. | |
| 2016/0283715 A1* | 9/2016 | Duke | G06F 21/566 |
| 2018/0047055 A1* | 2/2018 | DeWitt | G06Q 30/0261 |

OTHER PUBLICATIONS

Fowler, Martin: Event Sourcing: Capture all changes to an application state as a sequence of events, Dec. 12, 2005, pp. 1-17. (Year: 2005).*

Hinze et al.: Principles and Applications of Distributed Event-based Systems, Chapter 12: Event Processing in Web Runtime Environments, 2010, Information Science Reference, New York, pp. 1-25 (Year: 2010).*

Delić, Natali "Mobile Payment Solution—Symbiosis Between Banks, Application Service Providers and Mobile Network Operators". 2006. pp. 1-5.

* cited by examiner

EVENT NOTIFICATIONS FOR MULTIPLE SERVICES

The present disclosure relates generally to communication networks and, more particularly, to methods, computer-readable media and devices for processing event notifications.

BACKGROUND

Credit card fraud is a significant problem for credit card companies, the merchants that accept such cards, and legitimate card holders. For example, physical cards are often stolen or misplaced, and then used by someone other than the cardholder in a physical retail establishment. In some cases, a signature on a receipt or on an electronic pad is required, which may then be compared to the cardholder's signature on the card. In addition, the merchant may ask for additional identification, such as a driver's license, in order to verify that the cardholder is the one making the purchase. However, often these steps are not performed. The growth of online banking and retail services has also lead to a growing problem of fraudulent transactions involving such services.

SUMMARY

In one example, the present disclosure discloses a method, computer-readable medium, and apparatus for processing event notifications. For example, a processor receives an event notification of an event from a device of a service provider that is providing a service to a user, wherein the network service provider is distinct from the service provider, determines that the service provider and the event are of a type of service provider and a type of event, respectively, that the user has consented to receive the event notification, sends a message in a unified message format to a device of the user, the message comprising the event, receives a response from the device of the user containing an indication of whether the event is an authorized event, and sends the indication of whether the event is an authorized event to the device of the service provider.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
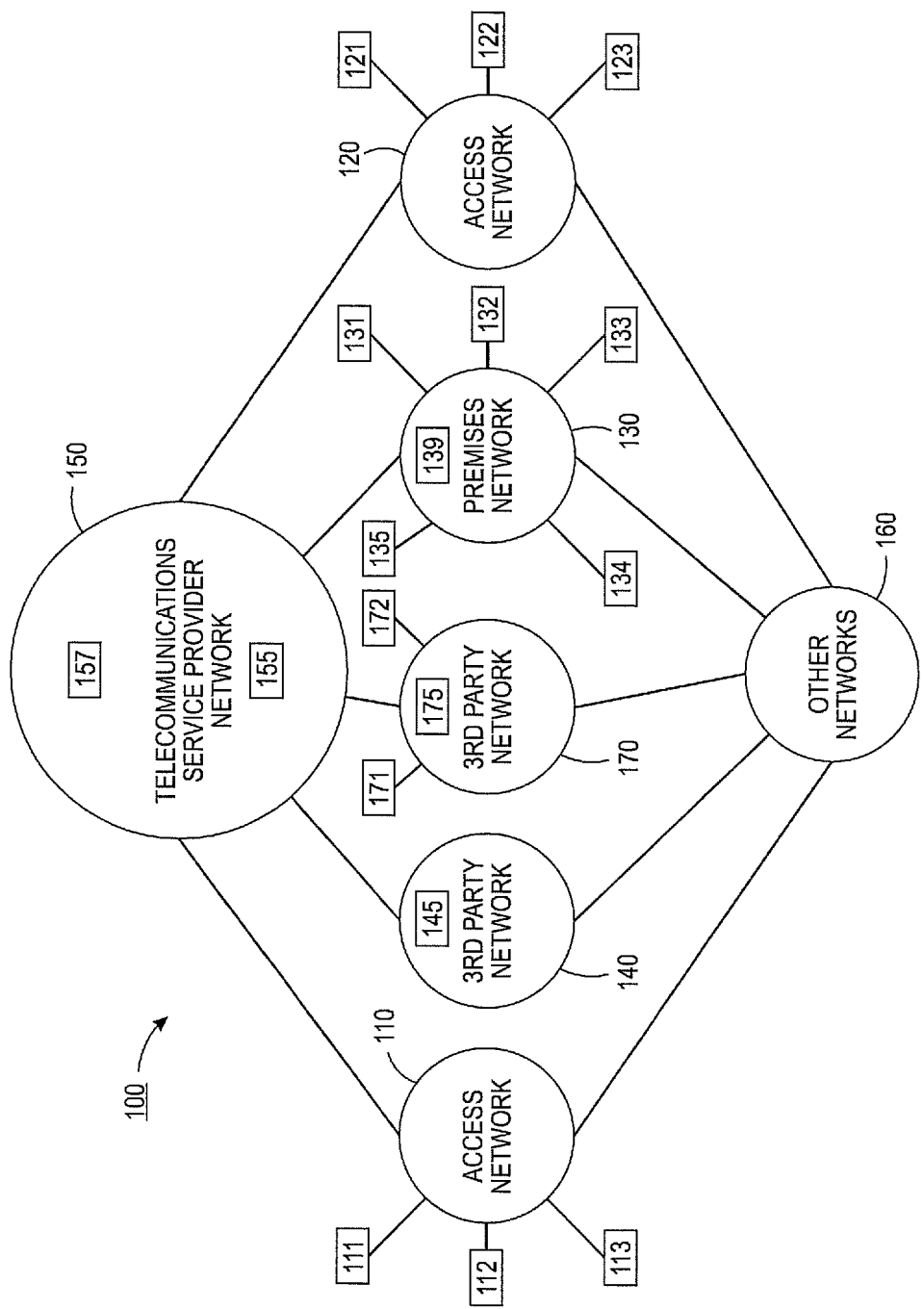
FIG. 1 illustrates an example network related to the present disclosure.

The present disclosure broadly discloses methods, computer-readable media and devices for processing event notifications. Although the present disclosure is discussed below in the context of wireless access networks and an Internet Protocol (IP) network, the present disclosure is not so limited. Namely, the present disclosure can be applied to packet switched or circuit switched networks in general, e.g., Voice over Internet Protocol (VoIP) networks, Service over Internet Protocol (SoIP) networks, Asynchronous Transfer Mode (ATM) networks, Frame Relay networks, and the like.

In one example, the present disclosure describes a unified network-based security platform for different service providers to notify customers of various types of events, such as credit card usage events, financial transaction events, home security system events, and so forth, and to receive confirmations from the customers of the subscribed services as to whether the events are authorized by the customers. The service providers may include credit card companies, banks, credit unions, brokerages, financial service companies, premises security/monitoring system service providers, Internet of Things (IoT) device management service companies, and so forth. In this regard, the term "service provider," as used herein, may refer to both providers/sellers of physical goods, as well as providers of "services."

In one example, each of the service providers may register with a network-based security platform for providing different event notifications for different types of events. For instance, a home monitoring system service provider may provide an event notification for when an entry alarm, e.g., a front door entry alarm is triggered, when an upstairs window is opened, when a thermostat setting is changed, and so on. In another example, a credit card company may provide an event notification with respect to an attempted online purchase or an attempted in-store purchase using the customer's credit cards. In one example, the event notifications for various events are presented to the customers on various customer devices using a unified message format. For instance, regardless of the type of event to which an event notification pertains, a customer may receive a message comprising the event notification, including information regarding the event, and two choices for responding to the event notification, such as, "It's Me" and "Not Me." Thus, the customer may select one of the two choices to respond, and the unified network-based security platform may relay the customer's response to the appropriate service provider that originated the event notification.

The "unified message format" broadly comprises a predefined message format that is defined by a network service provider of a telecommunications network. In other words, each of a plurality of third party service providers will likely have different event notification message format. Thus, different event notification messages from different third party service providers may have significant differences in how content of the event notification messages will be organized and presented, in how these event notification messages are sent as to the type of communication channels, and so on. In one example, the "unified message format" is independent of the event notification message format of the different third party service providers.

For example, a first third party service provider may send a first event notification message in a first message format and second third party service provider may send a second event notification message in a second message format, where the first message format is different from the second message format. In turn, the type of event from the first event notification message can be extracted and inserted into an event notification messages having a unified message format by a network service provider. Similarly, the type of event from the second event notification message can also be extracted and inserted into another event notification message having the unified message format as well. In this example, the network service provider is distinct from the first and second third party service providers. Thus, when the user receives both event notification messages having the unified message format, the user will immediately recognize the purpose of the event notification message given the familiar appearance of the event notification message. The user can then quickly evaluate the type of event indicated in the event notification messages having the unified message format and respond accordingly. It should be noted that the terms "event notification" and "event notification message" are used interchangeably.

In one example, the network-based security platform may be a component of a telecommunications network that provides various services to customers, who may also include users or subscribers who receive telecommunications services from the telecommunication network of the network-based security platform. For instance, the telecommunications network may provide one or more of: cellular telephony services, non-cellular telephony services, data services, delivery of multi-media services, and premises monitoring services (e.g., home or business monitoring services). For example, a telecommunications network may provide services such as home telephony services, home double- or triple-play services, business voice and Internet services, and so on. Thus, the network-based security platform of the present disclosure is situated to receive requests to transmit notifications to customers from various service providers, to track the customers to their devices to present messages containing the event notifications, to receive responses to the messages containing the event notifications, and to convey the customers' responses back to the respective service providers. In one example, the services of a network-based security platform of the present disclosure may be offered to customers/subscribers as a subscribed service for a fee, or at no additional cost, e.g., as a benefit in a loyalty program for subscribers who have subscribed to various services from the telecommunications network service provider for an extended period of time.

In one example, customers of different service providers may register with the network-based security platform and provide consent to receive event notifications from specific service providers that are selected by the customers, and/or to receive specific types of event notifications. For instance, a customer may desire to receive notifications from the customer's credit card providers or financial institutions. Thus, the customer may register and select the credit card providers or banks as service providers that are authorized to send notifications to the customer. On the other hand, the customer may also be a customer of a home monitoring system provider, and may already receive telephone calls regarding home alarm activation events as part of a basic service from the home monitoring system service provider. Therefore, the customer may not want to receive additional notifications from the network-based security platform of the present disclosure regarding home entry alarms. As such, the customer may not select the home monitoring system service provider as an authorized service provider to send notifications via the network-based security platform.

Finally, a service provider that does not provide a service to the customer will not be able to provide event notifications to the customer. In other words, service providers that are not currently providing services to the customer will not be allowed to send any notifications to the customer.

In one example, a service provider may register different event notification types with the network-based security platform. For example, the service provider may define one or more types of event notifications. For each type of event notification, the service provider may define one or more information fields for the event notification type. For instance, different event notification types may be created by a credit card service provider for attempted online purchases and attempted in-store purchases, respectively. For example, an event notification type for an attempted in store credit card purchase may include various fields, such as: the merchant attempting to charge the credit card, a location of the attempted purchase, e.g., a geographic location of the merchant's premises, a dollar amount, item(s) or service(s) attempted to be paid for, and so on. However, an event notification type for online purchases may include a field for an approximate location of a device being used to make the attempted purchase, as an alternative or in addition to an information field for a geographic location of the merchant. In still another example, a service provider may define and the network-based security platform may support non-text information to be conveyed as part of an event notification, such as an electronic map indicating a location of attempted in-store credit card purchase, a picture of an item that is the subject of an attempted online credit card purchase, and so forth.

In one example, the service provider may control what types of information may be conveyed in different types of event notifications. However, the network-based security platform may screen the registrations of different types of event notifications, e.g., for compliance with various requirements of a network operator, such as a maximum message size for an event notification, a maximum number of devices to which the event notification may be sent, and so forth. A message containing an event notification may take various forms. For instance, a message may comprise a short message service (SMS) or text message containing an event notification and instructions: "text reply 1 for 'It's Me' or 2 for 'Not Me'." In another example, the message may comprise a customized message that may be interpreted by an application running on a customer's device. For example, a specific desktop application may be installed and running on the customer's personal computer. Similarly, a specific application may be installed and running on the customer's mobile device to listen for and receive messages containing event notifications. In one example, the applications for a customer's mobile device or personal computer may be downloadable from the network-based security platform. In another example, the applications may be preinstalled on such device. For instance, the applications may be original equipment manufacturer (OEM)-required applications that are installed before shipping to end users. Examples of the present disclosure may also include applications that are bundled as part of a comprehensive security suite that may include anti-virus tools, anti-malware tools, etc.

In one example, the messages may comprise multimedia forms, e.g., a hypertext markup language (HTML) file, an extensible markup language (XML) file, and the like, to provide an interactive interface where the customer may select from one of two choices, e.g., "It's Me" or "Not Me," "authorized" or "unauthorized," "allow" or "deny," and so forth. In various examples, the interface may be text-based or may be graphical-based. In one example, as an alternative or in addition to a visual-based message (e.g., text or graphics), an audio-based message may be provided. For instance, a message containing an audio event notification may be received by a customer's device and presented to the customer via a headset or speaker. A response from the customer may then take the form of pressing a button or speaking a response. For instance, the audio message may instruct the customer to "press one on the telephone keypad for 'It's Me' or press two for 'Not Me'." Similarly, the audio message may instruct the customer to say "It's Me" or "Not Me" and the response may be interpreted by a speech processing system on the customer's device or of the network-based security platform.

One aspect of the unified message format is the ability to encourage the customer to quickly respond to the service provider making the inquiry. For example, different service providers may each have different formats for sending notification events. As such, customers may not react quickly enough if the customers does not realize that a response to such inquiries from the service providers are time sensitive. For example, a credit card company may send an email to the customer, whereas another credit card company may send an SMS message, whereas another credit card company may direct an automated audio warning message be sent to the customer's home phone and so on. If the customer does not check his or her emails in a timely fashion, then such inquires sent via an email system may not assist the service providers in a timely manner to stop potential fraudulent activities in a timely manner. Thus, a unified message format sent by the network-based security platform will cause the customer to be attuned to such notifications and to quickly respond by activating one of the two presented uniform responses: "It's Me" or "Not Me."

To illustrate, when a service provider determines that an event covered by the event notification type has occurred, the service provider may then send an event notification to the network-based security platform to be transmitted to the customer. For example, the service provider may include information pertaining to the event in one or more information fields of the event notification type. The network-based security platform is then tasked with transmitting the event notification in a unified message format to the appropriate customer and receiving a response from the customer. In one example, the event notification is transmitted to the customer via multiple modalities. For example, an event notification may be provided to the customer via the customer's mobile phone/smartphone, via the customer's home computer or laptop computer, via the customer's smart television or set-top box, and so forth.

In one example, since the network-based security platform is a component of a telecommunications network, the customer may be tracked to multiple devices that are accessible using various networks and protocols, and a message in a unified message format containing the event notification may be sent by the network-based security platform and routed to the various devices of the customer. For example, a message may be routed to the customer's mobile device, to a home computer or work computer of the customer, to the customer's smart television or set-top box in the customer's home, and so forth. In one example, the customer may set which devices should receive event notifications at which times of day, with respect to which type of notifications, and so forth. In one example, a service provider may also restrict which customer devices may receive event notifications of a particular event notification type. For example, for certain sensitive banking transactions a banking service provider may not want event notifications to be sent to mobile devices that are only accessible via a 2G cellular network infrastructure or via a public wireless Fidelity (Wi-Fi) network.

In one example, a service provider may provide a single identifier of a customer to the network-based security platform in order for the network-based security platform to determine the customer and to track the customer's device (s). For instance, a service provider may provide a telephone number of the customer along with an event notification pertaining to the customer. The network-based security platform may then determine the intended customer and further determine one or more devices of the intended customer where a message containing the event notification may be delivered. In another example, the service provider may present the customer's name along with an event notification. The network-based security platform may then verify that the customer has registered and consented to receive event notifications from the service provider by looking-up the customer's name. Upon confirmation, the network-based security platform may then route a message in a unified message format containing the event notification to the customer's device(s) that may be associated with the customer's name. Thus, the service provider does not need to have a full knowledge of the various types of devices, telephone numbers, email addresses, and so forth where the customer can be located. Instead, the network-based security platform may handle these functions on behalf of the service provider, and on behalf of various other services providers.

In examples of the present disclosure, a customer may receive a message in a unified message format from the network-based security platform comprising an event notification and a unified choice of two possible responses. For instance, the event notification may comprise a short description of the event may be included in the event notification for presentation to the customer, such as: "Someone attempted to use your ABC credit card at XYZ Store in Atlanta, Ga. at 11:04 am. Amount: 23.75." In addition to the description, a unified two-choice response interface may be provided to the customer. For instance, two buttons may be included in the message for presentation to the customer, such as: "It's Me" and "Not Me." The customer is tasked with selecting the appropriate button. For example, if the customer is attempting to make a purchase at the XYZ store in Atlanta, Ga., the customer may simply select the button to indicate "It's Me." However, if the customer is at home in Virginia at the time, the customer may select "Not Me" to indicate that the attempted purchase is unauthorized. The selection of the customer may be received by the network-based security platform and quickly conveyed back to the service provider. The service provider may then take any appropriate action as deemed proper by the service provider. For instance, a credit card service provider may deny an attempted purchase transaction or authorize the attempted purchase transaction, depending upon the selection of the customer in response to the "It's Me"-"Not Me" choice.

In another example, a service provider may comprise a television service provider that may provide event notifications regarding attempted on-demand paid programming purchases, acceptance of upgrade offers for premium programming subscriptions, and so forth. In one example, the television service provider may elect to have event notifications sent only to customers' personal computers or mobile devices, and specifically not sent to a smart television of the customer. For instance, the television service provider may wish to avoid an unauthorized person, e.g., a child, from making a purchase or upgrade via a smart television in the customer's home, and simply authorizing the transaction via the same smart television. Providing an event notification to the customer's mobile device may have a better chance that it is the customer, e.g., a responsible adult, responding "It's Me" or "Not Me." Thus, the response may be received by the network-based security platform and reported to the television service provider. The purchase may then be authorized or denied depending upon the selection of the customer of "It's Me" or "Not Me."

In still another example, a cloud-based/network-based storage service provider may register with the network-based security platform to provide notifications regarding access to a customer's files in a cloud-based storage device. For instance, someone may log-in to the customer's account with the network-based storage service and attempt to access, copy, delete or modify the customer's files. The network-based storage service provider may request that the network-based security platform transmit an event notification to the customer for confirmation of whether "It's Me" or "Not Me."

Notably, the event notification interface may be a unified interface that is the same across all customer devices and with respect to all types of notifications from various different service providers. In addition, the network-based security platform of the present disclosure may supplement existing security mechanisms for various services. Thus, an event notification message and customer response of the present disclosure may comprise one of the factors in a multi-factor authentication process. For instance, a customer may typically enters a personal identification number (PIN) on a keypad to disable a home security alarm when the customer enters the customer's home. Thus, in addition to entering a PIN, the customer may also receive a notification via the customer's mobile device that the alarm has been set off and/or that someone has also disabled the alarm by entering the correct PIN. As an added layer of security, the customer may be given the further opportunity to confirm "It's Me" or "Not Me" via an event notification to the customer's mobile device. For example, an unauthorized person may learn of the PIN and use it to attempt to gain access to the customer's home. However, if the customer is away and receives a notification on the customer's mobile device, the customer may confirm that it is someone else that is at the home disabling the alarm with the PIN.

In one example, the network-based security platform may automatically respond to certain requests to send event notifications to customers. For example, if a customer indicates "It's Me" in response to an event notification from a credit card service provider of an attempted purchase at Hartsfield Airport in or near Atlanta, Ga., a subsequent request from a home monitoring system service provider to transmit a notification to the customer regarding a home entry event at the customer's home in Virginia may automatically be responded to by the network-based security platform. For instance, the network-based security platform may respond to the home monitoring system service provider that it is not likely to be the customer entering the home, based upon previous information provided by the customer to the network-based security platform, e.g., an indication that the customer is actually in or near Atlanta, Ga. Notably, the event notification may still be presented to the customer, e.g., via the customer's mobile device and/or one or more additional devices. However, in the event the customer is unable to respond (e.g., traveling on an aircraft with mobile devices turned off), the service provider may still receive timely information from the network-based security platform. For instance, the customer may make a purchase at Hartsfield Airport in Atlanta before boarding a flight, confirm the purchase from the customer's mobile device in response to a message from the network-based security platform, and then promptly turn off the mobile device. Thus, the customer may not receive a subsequent message containing an event notification regarding the home entry alarm, and may therefore not provide a timely response to such a message. Nevertheless, the network-based security platform may provide an automated response based upon the customer's response to the previous message regarding the purchase in the airport. The network-based security platform may also indicate in the response to the service provider that the response is an automated response versus an active response sent by the customer in response to the service provider's inquiry.

In one example, additional information may be used to qualify a customer's response to an event notification. In one example, the customer may consent to providing certain types of additional information to the network-based security platform, such as providing calendar/scheduling information, providing biometric information, such as when the customer is wearing a fitness tracking band, a heart rate monitor, or the like, and so forth. For instance, a customer may receive an event notification for an attempted transfer of a large sum of money from the customer's bank account to an external account. The network-based security platform may receive a response to the event notification: "It's Me." However, additional information may be obtained that the customer is under duress. For example, if the customer is wearing a networked fitness tracking device it may record that the customer's heart rate is very elevated. As such, the network-based security platform may convey the customer's response to the banking service provider, but may qualify the response with additional information (e.g., current heart rate level of the customer) such as an indication that the response may have been possibly provided under duress and that the event may be a fraudulent event.

In still another example, the customer may consent to have images captured by a camera when providing responses to event notifications. For instance, the network-based security platform may receive a response, "It's Me," to an event notification regarding a transfer of a large sum of money to an external account. However, an image captured along with the response may include a face other than the customer's. In another example, the image may be of the customer's face, but it may be determined that the expression of the customer indicates that the customer is under duress. Thus, in either case, the network-based security platform may qualify the response, e.g., sending the image to the service provider and/or indicating to the service provider that the confirmation from the user, "It's Me," may be incorrect and that the event may be a fraudulent event.

In still another example, the network-based security platform may use predictive analytics to qualify the customer's response. For instance, the network-based security platform may track the location of a customer's mobile device and may also track various purchases of the customer. For instance, a customer may use a credit card to purchase an airline ticket, and information regarding the purchase may be shared with the network-based security platform. The customer may also set an "away" setting on the customer's home security system. In addition, the network-based security platform may track that the customer's mobile device is on a trajectory heading towards an airport near the customer's home. A message containing an event notification regarding an attempted in-store purchase at an airport shop may also be sent to the customer, and a response received from the customer, e.g., indicating a selection of "It's Me." In this case, a qualifier may comprise a notation that a customer response of "It's Me" is highly likely to be correct, insofar as the network-based security platform may confirm that the purchase location conforms with activities of the customer leading up to the attempted purchase.

These and other aspects of the present disclosure are discussed in greater detail below in connection with the examples of FIGS. 1-5.

To aid in understanding the present disclosure, FIG. 1 illustrates a block diagram depicting one example of a network, or system 100 suitable for performing or enabling the steps, functions, operations and/or features described herein. The overall communication system 100 may include any number of interconnected networks which may use the same or different communication technologies, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, and so forth. It should be noted that an IP network is broadly defined as a network that uses Internet Protocol to exchange data packets.

As illustrated in FIG. 1, the system 100 comprises a plurality of different networks for supporting event notification interactions. Telecommunications service provider network 150, e.g., operated by a network service provider, may comprise a core network with components for telephone services, Internet services, and/or television services (e.g., triple-play services, etc.) that are provided to subscribers, and to peer networks. In one example, telecommunications service provider network 150 may combine core network components of a cellular network with components of a triple-play service network. For example, telecommunications service provider network 150 may functionally comprise a fixed mobile convergence (FMC) network, e.g., an IP Multimedia Subsystem (IMS) network. In addition, telecommunications service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunications service provider network 150 may also further comprise a broadcast television network, e.g., a traditional cable provider network or an Internet Protocol Television (IPTV) network, as well as an Internet Service Provider (ISP)) network. With respect to television service provider functions, telecommunications service provider network 150 may include one or more multimedia servers for the delivery of multimedia content, e.g., a broadcast server, a cable head-end, a video-on-demand (VoD) server, and so forth. For example, telecommunications service provider network 150 may comprise a video super hub office, a video hub office and/or a service office/central office. For ease of illustration, various components of telecommunications service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, 121-123, and telecommunications service provider network 150 relating to voice telephone calls, communications with web servers via the other networks 160, e.g., the Internet, premises network 130, and/or third-party networks 140 and 170, and so forth. Access networks 110 and 120 may also transmit and receive communications between endpoint devices 111-113, 121-123 and other networks and devices via other the other networks 160. For example, one or both of the access networks 110 and 120 may comprise an ISP network, such that endpoint devices 111-113 and/or 121-123 may communicate over the other networks 160, without involvement of telecommunication service provider network 150. Endpoint devices 111-113 and 121-123 may each comprise a mobile device, a cellular smart phone, a laptop computer, a tablet computer, a desktop computer, a cluster of such devices, and the like. Any one or more of endpoint devices 111-113 and 121-123 may also comprise a wearable device, such as a smart watch, a networked fitness monitor, and the like. In one example, any one or more of endpoint devices 111-113 and 121-123 may comprise programs, logic or instructions for processing event notifications in accordance with the present disclosure.

In one example, the access networks 110 and 120 may be different types of access networks. In another example, the access networks 110 and 120 may be the same type of access network. In one example, one or more of the access networks 110 and 120 may be operated by the same or a different network service provider from a network service provider operating telecommunications service provider network 150. For example, each of access networks 110 and 120 may comprise an Internet service provider (ISP) network, a cable access network, and so forth. In another example, each of access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide mobile core network functions, e.g., of a public land mobile network (PLMN)-universal mobile telecommunications system (UMTS)/General Packet Radio Service (GPRS) core network, or the like.

In one example, third-party network 140 may comprise a local area network (LAN), or a distributed network connected through permanent virtual circuits (PVCs), virtual private networks (VPNs), and the like. In one example, third-party network 140 may be operated by a service provider, e.g., a merchant, a bank, a credit card provider, a premises security/monitoring service provider, or other type of entity that provides services, including the sale of goods, e.g., a department store, to customers/users. In one example, third-party network 140 may also include an application server (AS) 145. In one example, AS 145 may comprise a computing system or a database server, such as computing system 500 depicted in FIG. 5, and may be configured to provide one or more functions for processing event notifications, in accordance with the present disclosure.

Similarly, third-party network 170 may comprise a local area network (LAN), or a distributed network connected through permanent virtual circuits (PVCs), virtual private networks (VPNs), and the like. In one example, third-party network 170 may be operated by service provider, e.g., a service provider that is different from that which operates third-party network 140. In one example, third-party network 170 may also include an application server (AS) 175 and devices 171 and 172. In one example, AS 175 may comprise a computing system or a database server, such as computing system 500 depicted in FIG. 5, and may be configured to provide one or more functions for processing event notifications, in accordance with the present disclosure. As described in examples below, devices 171 and 172 may take various form depending upon the nature of the service provider operating third-party network 170.

Premises network 130 may comprise a local area network (LAN), or a distributed network connected through permanent virtual circuits (PVCs), virtual private networks (VPNs), and the like. In one example, premises network 130 links one or more devices 131-135 with each other, the other networks 160, the telecommunications service provider network 150, and devices accessible via such other networks, such as endpoint devices 111-113 and 121-123, and so forth. In one example, premises network 130 comprise a network of a home, a business, an educational institution, and so forth. In one example, premises network 130 may include a device 139, e.g., a gateway, router, or the like, which receives communications associated with different types of media, e.g., television, phone, and Internet, from devices external to premises network 130 and separates these communications for the appropriate devices. Similarly, device 139 may receive communications from various devices within premises network 130 and route the communications to other devices within premises network 130 or external to premises network 130, e.g., via other networks 160, via telecommunications service provider network 150, and so forth. As described in examples below, devices 131-135 may take various forms depending upon the nature of the premises network 130.

In one example, telecommunications service provider network 150 may include an application server (AS) 155 (e.g., a dedicated database server) for providing one or more functions for processing event notifications in accordance with the present disclosure. For example, the telecommunications service provider network 150 may provide an event notification service to one or more service providers/subscribers and to one or more users/subscribers in addition to other telecommunication services. In one example, AS 155 may comprise a network-based security platform as described above. In one example, AS 155 may also comprise a computing system, such as computing system 500 depicted in FIG. 5. In one example, telecommunication service provider network 150 may also include an application server 157 (e.g., another dedicated database server) for providing an additional network-based service to users/subscribers, as described in greater detail below. In one example, AS 157 may also comprise a computing system, such as computing system 500 depicted in FIG. 5. In one example, AS 155, AS 145, AS 175 and/or AS 157 may cooperate to perform various aspects of the present disclosure in a distributed manner.

In addition, it should be noted that the network 100 may be implemented in a different form than that illustrated in FIG. 1, or may be expanded by including additional endpoint devices, access networks, network elements, application servers, etc. without altering the scope of the present disclosure.

With reference to FIG. 1, various examples of the functioning of a network-based security platform, or event notification service, will now be described. As a first example, third-party network 170 may comprise a merchant, where devices 171 and 172 may comprise point-of-sale terminals in different stores, and AS 175 may comprise a centralized database server for processing payment transactions of the point-of-sale terminals. In one example, the merchant may register with a network-based security platform, e.g., AS 155 of telecommunications service provider network 150 for sending event notifications to customers. For instance, the merchant may send a registration request via AS 175 to AS 155. The request may include an event notification type and various fields of information for the event notification type. The event notification type may be approved, e.g., by AS 155, when the event notification type complies with various formatting and other requirements that may be established by the operator of telecommunications service provider network 150.

A customer may also register with the network-based security platform, e.g., AS 155 of telecommunication service provider network 150, to provide consent to receive event notifications from the merchant of third-party network 170. In addition, the customer may have multiple devices where the customer consents to receive event notifications. For instance, endpoint device 111 may comprise the customer's mobile phone, where access network 110 may comprise a cellular access network via which endpoint device 111 is accessible. In addition, premises network 130 may comprise the customer's home network where, for example, device 131 may comprise a home personal computer, device 132 may comprise a smart television, device 133 may comprise a Wi-Fi device, such as a tablet computer, and so forth. Still further, access network 120 may comprise a network at the customer's place of business. Thus, for instance, endpoint device 121 may comprise the customer's work computer. The registration of the customer and the providing of consent to receive event notification(s) may be received from any one of such devices of the customer.

The customer may also specifically register one or more of these various devices to receive event notifications. Alternatively, or in addition, the customer may also be a subscriber of telecommunications services from telecommunications service provider network 150. In this case, AS 155 may determine the customer devices based upon a customer profile of the customer that may catalog the various customer devices. For instance, the telecommunications service provider network 150 may provide home triple-play services. Thus, the telecommunications service provider network 150 may have a record of several customer devices at premises network 130. In addition, telecommunications service provider network 150 may provide cellular telephony and data services via access network 110. Thus, telecommunications service provider network 150 may also have a record of the customer's mobile device, e.g., endpoint device 111, including the current location, serving base stations, a visiting location register (VLR), a serving gateway support node (SGSN), a current Internet Protocol (IP) address, and so forth.

Continuing with the present example, an attempted purchase transaction at device 171 may involve a credit card of the customer and be notified by device 171 to AS 175. In turn, AS 175 may send an event notification to AS 155 of the telecommunication service provider network 150. AS 155 may verify that the customer has consented to receive event notifications from the merchant of third-party network 170. Upon confirmation, AS 155 may then attempt to send a message containing the event notification to one or more devices of the customer, such as endpoint device 111, e.g., the customer's mobile phone, device 131, e.g., the customer's personal computer at the customer's home, endpoint device 121, e.g., the customer's work computer, and so forth. As mentioned above, the customer may set preferences as to which devices may receive which type of event notifications and at which times. Thus, AS 155 may send a message containing the event notification to one or more devices of the customer, according to the customer preferences and the availability of the respective devices.

A response may be received from any one of the customer's devices to which the message was sent. For instance, the customer may be at home and turned off the endpoint device 111. However, the customer may be working on a home computer, e.g., device 131, where the message may be received. The message may include the event notification and a response interface containing two unified response choices, e.g., "It's Me" and "Not Me." The user may provide a response by pressing one of two buttons corresponding to the two response choices, texting one of two possible responses corresponding to the two response choices, and so forth, depending upon the nature of the event notification message and/or depending upon the capabilities and type of device on which the message is received and presented for the user. In the present example, and for illustrative purposes, the response may be conveyed from device 131 to AS 155, and relayed by AS 155 to AS 175 of the third-party network 170.

In another example, third-party network 140 may comprise a network of a credit card provider, where AS 145 may comprise a server for processing credit card payment transactions. The credit card provider may register one or more event notification types with AS 155. A customer may also provide consent to AS 155 to receive event notifications from the credit card provider regarding events relating to the customer's credit card. In this example, the customer may comprise the same customer as the example above. Thus, possible devices of the customer where the customer may receive event notification messages may include endpoint device 111, device 131, device 132, and endpoint device 121, for example.

To illustrate, an in-store use of the credit card may be attempted, e.g., at device 172 in third-party network 170. AS 175 in third-party network 170 may communicate with AS 145 in third-party network 140 to obtain authorization to complete the transaction. However, AS 145 may first send an event notification of the attempted in-store credit card transaction to a network-based security platform, e.g., AS 155. AS 155 may convey a message to one or more customer devices containing the event notification and further including the unified two choices for a response. When AS 155 receives a response from one of the customer devices, AS 155 may relay the response to AS 145. In turn, AS 145 may message AS 175, e.g., either authorizing or denying the attempted in-store credit card purchase. Notably, in this example, the customer may not be registered to receive event notifications from the merchant of third-party network 170. Rather, the customer may register and consent to receive event notifications from the credit card provider of third-party network 140.

A similar process may be followed with respect to an attempted online purchase/transaction involving the customer's credit card. However, the message from AS 155 to the customer devices may contain different information than a message relating to an in-store purchase attempt. For example, the message relating to an in-store purchase attempt may include a location of the in-store purchase attempt, e.g., a physical location of device 171. On the other hand, the message relating to an online purchase attempt may instead indicate a physical location or network address of a device from which the purchase attempt is originated.

In still another example, premises network 130 may comprise a home, a business, an office, an educational institution, etc., where, for example, devices 134 and 135 may comprise a door alarm and window alarm, respectively. For purposes of the present example, third-party network 140 may comprise a network of a security/monitoring system service provider. Thus, AS 145 may comprise a server for monitoring alarms of customer premises security devices. The security/monitoring system service provider may register with AS 155 to provide event notifications regarding security device alarms. In addition, a customer, e.g., an owner or operator of premises network 130 may register with AS 155 and consent to receive such event notifications from the security/monitoring service provider.

An opening of a door may trigger an activation of device 134, e.g., a door alarm. An alert may be transmitted by device 134 to AS 145, e.g., via telecommunications service provider network 150 and/or via other networks 160. To verify whether the opening of the door is an authorized event, AS 145 may send an event notification to AS 155. AS 155 may verify that the customer has consented to receive event notifications from the security/monitoring service provider. Upon verification, AS 155 may transmit a message in a unified message format containing the event notification and further including two unified response choices to one or more devices of the customer. For example, the message may be sent to endpoint device 112, which may comprise the customer's mobile telephone. In this example, access network 110 may therefore comprise a cellular access network through which the customer's mobile telephone is accessible.

In one example, an application on the customer's mobile telephone, e.g., endpoint device 112, may receive the message and display the message for the customer on a display of the endpoint device. The customer may select one of the two unified response choices, e.g., "It's Me" or "Not Me" and the endpoint device 112 may convey the response to AS 155. AS 155 may then provide the response to AS 145. If the customer has selected "Not Me," the security/monitoring service provider may take various actions, such as to dispatch police to a location of premises network 130, to activate a camera and record footage at a location of premises network 130, and so forth.

In yet another example, telecommunications service provider network 150 may provide a cloud-based/network-based storage service to subscribers/customers, e.g., via AS 157. It should be noted that network-based storage services may be distributed over one or more physical devices in one or more physical locations. For instance, network-based storage services may be distributed over multiple devices at various geographically separated sites, e.g., in different cities, different states, and/or different countries. However, for illustrative purposes, an example will be described where network-based storage services are provided by AS 157.

For purposes of the present example, premises network 130 may comprise a customer's home or business network, where the customer subscribes to one or more telecommunications services from telecommunications service provider network 150, such as Internet, telephone, and television services. In addition, the customer may also subscribe to network-based storage services from telecommunications service provider network 150, or may have access to such services as part of a subscription bundle. In any case, the customer may register with AS 155 and consent to receive event notifications regarding access to the customer's files on the network-based storage platform, e.g., AS 157. Thus for instance, someone may log-in using the customer's account and attempt to access, copy, delete or modify the customer's files. Upon detecting the attempted access, AS 157 may request that AS 155 transmit an event notification message to the customer for confirmation. The message may include information relating to the event, e.g., which files were attempted to be accessed, the nature of the attempted access, e.g., read, print, delete, copy, download, modify, etc., the IP address of the device attempting the access, the time of the attempted access, and so forth, along with two unified response choices, e.g., "It's Me" or "Not Me." In the present example, the message may be sent to a mobile device of the customer, e.g., endpoint device 113 and/or a home or work computer of the customer, e.g., device 131. If the customer is currently present at device 131, the customer may provide a response via the interface presented on device 131 to AS 155. AS 155 may provide the customer's response to AS 157 to allow or deny the transaction, to place a temporary hold on the transaction, and so forth.

The present example has been described in terms of a network-based storage service of telecommunications service provider network 150. However, in another example, a third-party network-based storage service provider may offer network-based storage services to customers, and may register with AS 155 of telecommunications service provider network 150 to provide event notifications in a similar manner to other service providers described above.

In another example, a service provider may comprise a multimedia delivery service provider that may provide event notifications regarding attempted on-demand paid programming purchases, acceptance of upgrade offers for premium programming subscriptions, and so forth. For instance, the telecommunications service provider network 150 may provide television services to a customer, such as an owner or operator of premises network 130. In this example, AS 157 may comprise a cable-head end, an on-demand server, or similar network-based device for providing interactive television services. As in the other examples above, the customer may register and consent to receive event notifications regarding the television service by interacting with AS 155 in order to provide such consent. In one example, the multimedia delivery service provider may elect to have event notifications sent only to customers' personal computers or mobile devices, and specifically not sent to a smart television of the customer. For instance, AS 157 may receive an attempted purchase or upgrade via a smart television in the customer's home, e.g., device 132. AS 157 may request that AS 155 send an event notification to the customer to verify the event. However, in one example, AS 155 may send a message in a unified message format containing the event notification to the customer's mobile device, e.g., endpoint device 111, but may specifically not send the message to a smart television of the customer, e.g., device 132. In this way, there may be a better chance that it is the customer, e.g., a responsible adult rather than a child using the television, who is responding "It's Me" or "Not Me." Thus, the response may be received by AS 155 and reported to AS 157 to authorize the transaction, deny the transaction, place the transaction on hold, etc.

The foregoing examples provided in connection with FIG. 1 comprise a non-exhaustive representation of the types of event notifications for various service provider that may be facilitated in connection with an example network-based security platform of the present disclosure. For instance, in another example, a social networking service provider may provide event notifications for attempted logins to social networking accounts, attempted accesses of user personal profiles, attempted changes to social networking account settings, and so forth. In another example, event notifications may relate to operations of a vehicle (e.g., a vehicle monitoring service), such as opening a car door via a PIN entered on a keypad, a payment of a toll at a toll plaza, and so forth. In still another example, an event notification may relate to the accessing of medicine from a medical supply cabinet, the exiting of a patient from a hospital, and so forth. For instance, the medical supply cabinet may be network-connected to a home monitoring service and have a key or keypad lock for opening the medical supply cabinet. In addition, the medical supply cabinet may track its own inventory using radio frequency identification (RFID) tags or the like that are affixed to various medicine containers. A first type of event notification may relate to the opening of the medical supply cabinet. A second type of event notification may relate to the removal of a medicine container, or containers, from the medical supply cabinet. Thus, various other types of event notifications from various types of service providers may be processed in accordance with the present disclosure.

Figure 2:
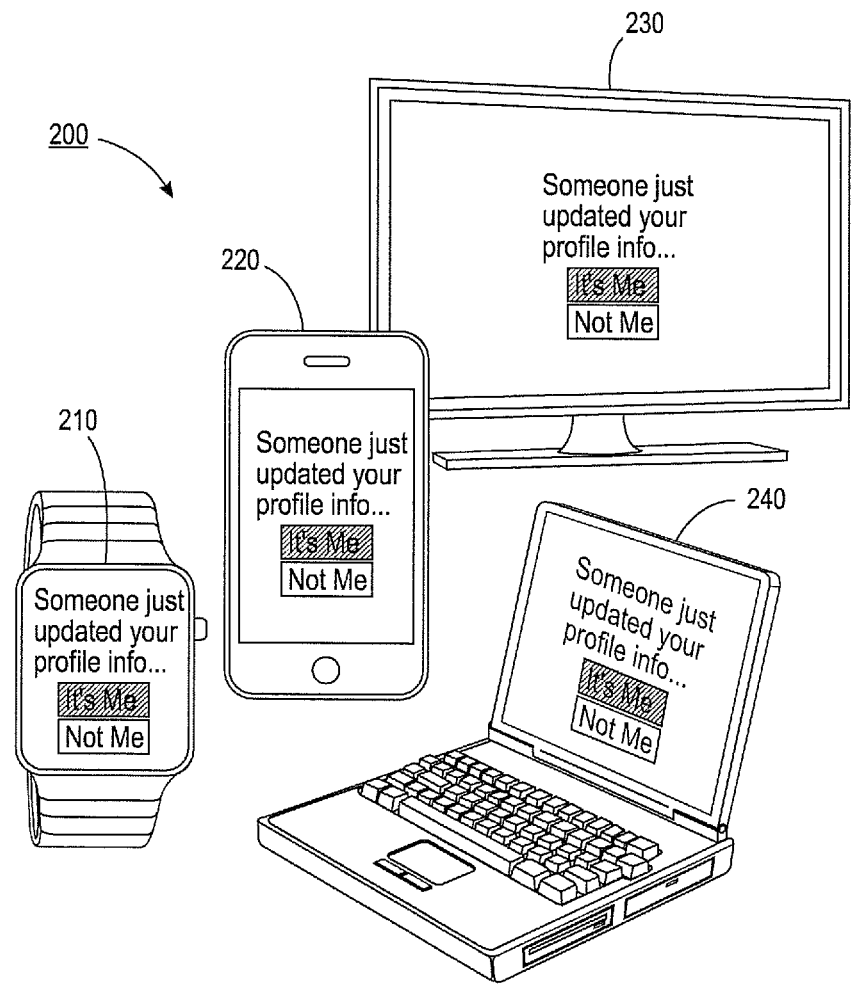
FIG. 2 illustrates an example set of devices presenting a unified event notification message interface, in accordance with the present disclosure.

FIG. 2 illustrates a set 200 of example devices showing a unified interface or unified message format for a message containing an event notification, in accordance with the present disclosure. The devices in the set 200 may comprise various devices of a customer. For example, the customer may have consented to receive event notification messages at each of devices 210, 220, 230, and 240. For instance, device 210 may comprise a smart wearable device of the customer, device 220 may comprise the customer's mobile telephone, or smartphone, device 230 may comprise a smart television of the customer, and device 240 may comprise the customer's laptop computer. As illustrated in the example of FIG. 2, the message presentation is unified across devices 210, 220, 230, and 240. In other words, the same message "Someone just updated your profile info . . . " is presented. In addition, the same unified two-choice response interface with buttons "It's Me" and "Not Me" is presented on each of the devices 210, 220, 230, and 240. In this example, the message may comprise an event notification from a social media service provider pertaining to a social media account of the customer. In one example, since the message is presented on multiple devices of the customer, the customer may provide a response via any one of the customer's device 210, 220, 230, or 240.

It should be noted that the example of FIG. 2 depicts just one example of a message format/message interface of the present disclosure. For instance, as mentioned above, in another example, the message may be comprise a text message with instructions to text a response including "1" or "2" to indicate "It's Me" or "Not Me," respectively. In yet another example, the message may be presented as an audio message with instructions to press "1" or "2" on a keypad to respond. Thus, the example of FIG. 2 is provided for illustrative purposes only.

Figure 3:
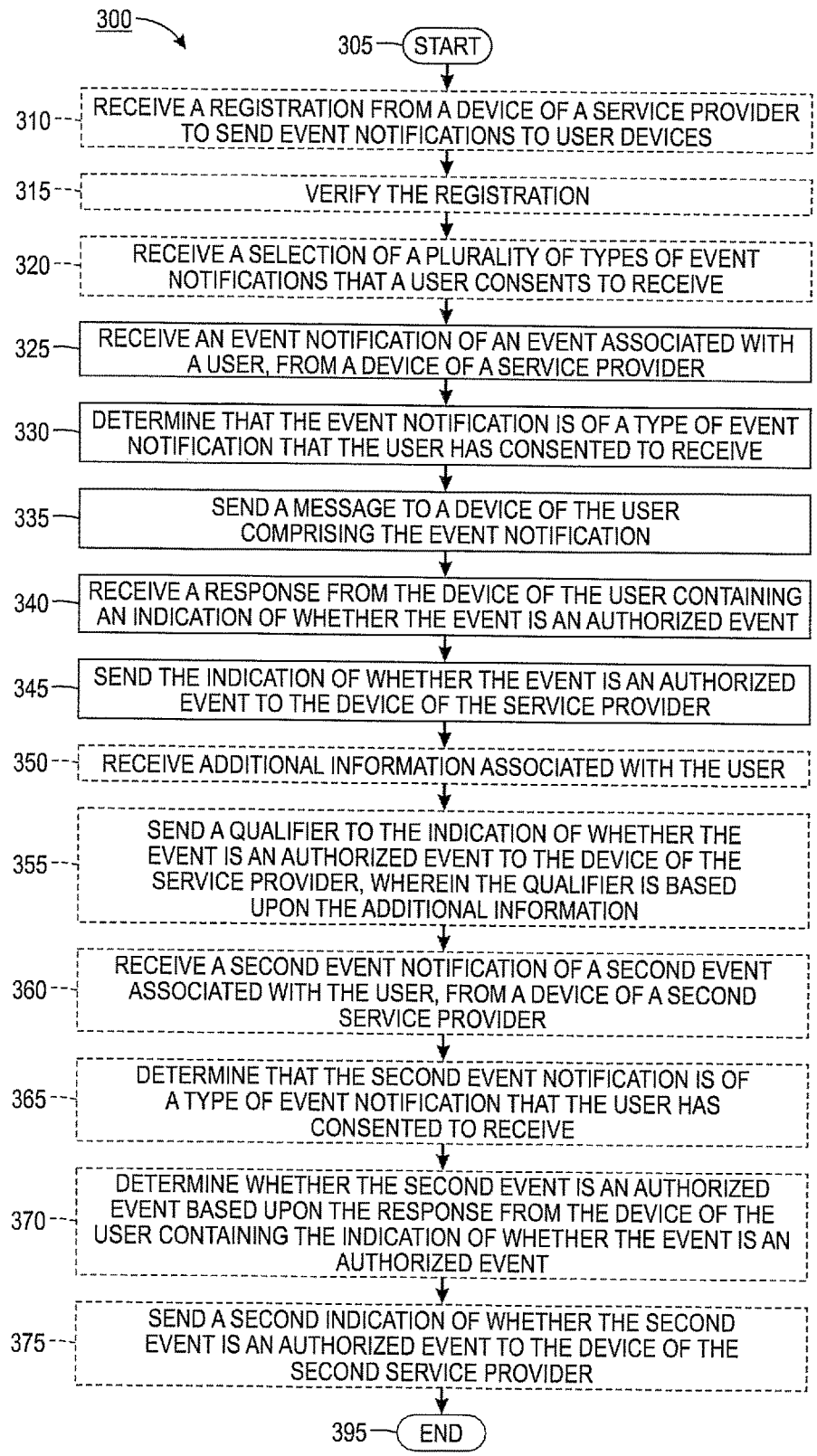
FIG. 3 illustrates an example flowchart of a method for processing event notifications, in accordance with the present disclosure.

FIG. 3 illustrates an example flowchart of a method 300 for processing event notifications in accordance with the present disclosure. In one example, steps, functions and/or operations of the method 300 may be performed by a network-based device, e.g., application server 155, in FIG. 1. In one example, the steps, functions, or operations of method 300 may be performed by a computing device or system 500, and/or processor 502 as described in connection with FIG. 5 below. For illustrative purposes, the method 300 is described in greater detail below in connection with an example performed by a processor, such as processor 502. The method begins in step 305 and may proceed to optional step 310, or to step 325.

At optional step 310, the processor may receive a registration from a device of a service provider to send event notifications to user devices, e.g., devices of customers of the service provider. In one example, the registration may include an event notification format and a number of parameters pertaining to the event notification format. For instance, the registration may include a maximum event notification size, the types of user devices to which event notifications may be sent, a time period to wait for a reply from a user, a format of information that may be included in the event notification, e.g., text information, graphical information, audio information, map information, combinations of the foregoing, and so forth.

At optional step 315, the processor may verify the registration. For instance, the processor may determine whether the registration conforms to various requirements or protocols that may be determined by a network operator. For instance, the network operator may determine a maximum length of text for an event notification, a maximum size of multimedia data that may comprise an event notification, and so forth. In addition, the processor may verify that the service provider has provided valid contact information, e.g., including a valid email address, telephone number, business address, etc. If the registration received at optional step 310 conforms to such requirements, the event notification type may be approved and the service provider may then begin providing event notifications for transmission to customers.

At optional step 320, the processor may receive a selection of a plurality of types of events that a user, e.g., a customer, consents to receive. For instance, via any one or more devices of the user, the user may submit to the processor a registration and consent to receive event notifications from various service providers. Alternatively, or in addition, the user may submit consent(s) to receive particular event types. For instance, a user may select to receive notifications of events of attempted online credit card purchase transactions from a credit card service provider, but may elect not to receive notifications of events of attempted in-store credit card purchase transactions from the same credit card service provider. The user may further select to receive notifications of events from a home security/monitoring service provider pertaining to alarm events from the user's home security system for opening of a safe alarms but not for door entry or window opening alarms, and so on.

At step 325, the processor receives an event notification of an event associated with the user from a device of a service provider. The type of event may relate to various transactions or occurrences such as: an in-store purchase transaction using a credit card of the user, an automated teller machine transaction, an online financial transaction, including an online credit card purchase using the credit card of the user, a purchase using a bank account or other account of the user, an electronic fund transfer, and the like, a premises security device event, a network-based data storage access event, a multimedia service usage event, an accessing of a social media account of the user, a motor vehicle toll payment using an automated toll-pay account of the user, an activation of an alarm of a home or premises security system of the user, and so forth. In addition to the event notification, or a type of event contained within the event notification, the processor may also receive an identification of the user to which the event notification pertains. For instance, the user may be identified by various types of identifiers that can be correlated to the user, such as: the user's actual name, email address, telephone number, account identifier (ID), user name or screen name for an online service, and so on.

In one example, the event notification may include text or other information pertaining to the event. For instance, the event notification may include text that identifies a merchant where an attempted credit card purchase is occurring, a location of the attempted credit card purchase, an item or items attempted to be purchased, a dollar amount of the attempted purchase, and so forth. Alternatively, or in addition, the event notification may include an electronic map with a pin identifying the location of the event, an image of an item attempted to be purchased, and so on. In another example, an event notification of an attempted access to a user's files in a network-based storage device may include an identification of an IP address from which the access is being attempted, user agent parameters relating to the attempted access, e.g., a type of device, operating system, installed peripherals and other settings, and so forth. Thus, various different types of information may be included in event notifications for different types of events from various service providers. In one example, the device of the service provider from which the event notification is received at step 325 may comprise the same device of the same service provider from which a registration was received at optional step 310.

At step 330, the processor determines that the service provider and/or the event notification for a type of event are of a type of service provider and/or event notification for a type of event that the user has consented to receive. For example, as described above in connection with optional step 320, the processor may receive a selection of a plurality of service providers and/or a plurality of types of event that a user consents to receive. Thus, the processor may compare the event notification received a step 325 to a list of event types and/or a list of service providers for which the user has consented to receive event notifications.

At step 335, the processor sends a message in a unified message format to a device of the user comprising the event notification, e.g., in response to determining at step 330 that the user has consented to receive an event notification of the particular event type. In one example, the message may include the event type and a unified two-choice response interface, e.g., to allow the user to indicate "It's Me" or "Not Me." In one example, the processor may first determine which types of devices may receive the event notification. For instance, the service provider may specify that event notifications of the particular event type should only be sent to users' mobile devices, and should not be sent to personal computers, smart televisions, etc. In one example, the processor may further determine the device(s) via which the user has consented to receive the event notification message. For instance, a user may specify that messages for certain event types should only be sent to the user's mobile device. Similarly, the user may specify that no messages for any event type should be sent to the user's home computer between the hours of 8:00 am and 6:00 pm. In addition, the processor may further determine which device(s) of the user are presently available to receive event notification messages. For instance, the processor may determine that the user's mobile device is presently powered off. For example, the processor may query a cellular network component, such as a home location register (HLR) or home subscriber server (HSS), and determine that there is no currently tracked location for the user's mobile device, indicating that the mobile device may be powered off, or may be out of range of cellular network infrastructure. Thus, the processor may determine that it should not attempt to send the message to the user's mobile device. However, an application for supporting the event notification interactions of the present disclosure may be installed on the user's home computer and may send periodic messages to the processor to indicate the availability of the user at the home computer to receive event notification messages. Thus, at step 335, the processor may sent a message to the user's home computer, and any one or more devices of the user that may be available to receive the message containing the event notification.

At step 340, the processor receives a response from the device of the user containing an indication of whether the event is an authorized event. In one example, the indication may be generated by the user selecting one of two unified buttons via graphical user interface of an application running on the device of the user, e.g., a button for "It's Me" and a button for "Not Me." In another example, the message may comprise a text message, and the response may comprise a response code, e.g., "1" for "It's Me" and "2" for "Not Me." In still another example, the message may comprise an audio event notification and an instruction for the user to press "1" on a telephone keypad for "It's Me" and to press "2" on the telephone keypad for "Not Me."

At step 345, the processor sends the indication of whether the event is an authorized event to the device of the service provider. For example, regardless of the format in which the processor receives the response at step 340, the processor may convey a binary response to the service provider containing the user's selection, e.g., "It's Me" or "Not Me." Using the indication of whether the event is an authorized event, the service provider may then determine any appropriate action, such as to allow the event, deny the event, place the event on hold, allow the event and code the transaction as being confirmed by the customer, and so on. Following step 345, the method 300 may proceed to step 395 where the method ends, or may proceed to optional step 350.

At optional step 350, the processor receives additional information associated with the user. For example, the user may consent to provide, share, or otherwise allow access to calendar information, social networking information, location information, credit card transaction information, biometric information, and so forth with the processor.

At optional step 355, the processor sends a qualifier to further indicate whether the event is an authorized event to the device of the service provider. The qualifier may be based upon the additional information associated with the user that is received at step 350. For example, the processor may use such additional information to confirm the likelihood that the indication of whether the event is an authorized event was actually provided by the user, or to determine that the indication may be fraudulent. For instance, an unauthorized person may steal the user's bag with the user's credit card and mobile phone. If the unauthorized person attempts to make a purchase using the credit card and an event notification regarding the purchase attempt is sent to the user's mobile device, the unauthorized person may simply attempt to authorize the fraudulent transaction by providing a response, "It's Me," via the user's mobile device. However, the user may consent to provide the processor with presence information that may include time stamps of the user logging into and out of a work computer, tracking/location information regarding the user's motor vehicle, and so forth. Thus, the additional information comprising presence information of the user may be received from a device other than a stolen device of the user, and may indicate that the user is at work, that the user is driving the user's car, and so on. Similarly, calendar information of the user may indicate that the user is scheduled to be at an entirely different location from a location of the event. Thus, where the location of an event and an actual location or a scheduled location of the user does not match, the processor may determine that the response/indication received at step 340 may still potentially be fraudulent. As such, the processor may provide a qualifier to the device of the service provider comprising a notation or warning that the indication of whether the event is an authorized event may still be potentially fraudulent.

In another example, the additional information may comprise biometric information of the user relating to a physical parameter of the user, such as a heart rate and/or a breathing rate of the user, e.g., provided via a wearable device of the user. If the heart rate and/or breathing rate of the user exceeds a threshold, the processor may interpret this information as indicative of the user being under duress. As such, the processor may send a qualifier warning that the indication of whether the event is an authorized event may have been provided under duress, and that the event may therefore be a potentially fraudulent event.

In still another example, the user may consent to have a camera of a device of the user capture an image each time a response to an event notification message is provided. Thus, the processor may determine that an image captured in connection with a response to an event notification message includes an image of a face that is not the user. Alternatively, or in addition, the processor may determine that the image contains a face of the user, but that the expression on the face is indicative of duress. The processor may use any available facial and/or expression recognition algorithms that are available in order to confirm or deny a match to a stored image of the user's face, and/or to determine a state of expression of the user's face. Following optional step 355, the method 300 may proceed to step 395 where the method ends, or may proceed to optional step 360.

At optional step 360, the processor receives a second event notification of a second event associated with the user. The second event notification of the second event may be received from a service provider that is different from the service provider from which the event notification is received at step 325.

At optional step 365, the processor determines that the second event notification of the second event is of a type of event notification that the user has consented to receive. In one example, optional step 365 may comprise similar operations to the operations described above in connection with step 330.

At optional step 370, the processor determines whether the second event is an authorized event based upon the response from the device of the user containing the indication of whether the event is an authorized event. In other words, the processor may use the user's response to the first event notification message of the first event to automatically respond to the second event notification. For example, the user may make a credit card purchase at Hartsfield Airport in or near Atlanta, Ga. An event notification may be generated by the credit card service provider and passed to the processor to send an event notification message to one or more devices of the user. The user may respond, e.g., via the user's mobile phone that the event is authorized. However, the user may promptly turn off the mobile phone for a departing flight. Thus, a second event notification, e.g., from a home security/monitoring system service provider regarding a home entry event at the customer's home in Virginia may go unacknowledged. However, given that the processor has recently received a verification from the user regarding the first event notification message, the processor may automatically determine that the event is potentially or likely an unauthorized event based upon the previous indication that the credit card transaction at the airport (in a different state) was an authorized event.

At optional step 375, the processor sends a second indication of whether the second event is an authorized event to the device of the second service provider. For instance, the processor may send a message conveying the determination of the processor reached at optional step 370.

Following optional step 375, the method 300 may proceed to step 395. At step 395, the method 300 ends.

Figure 4:
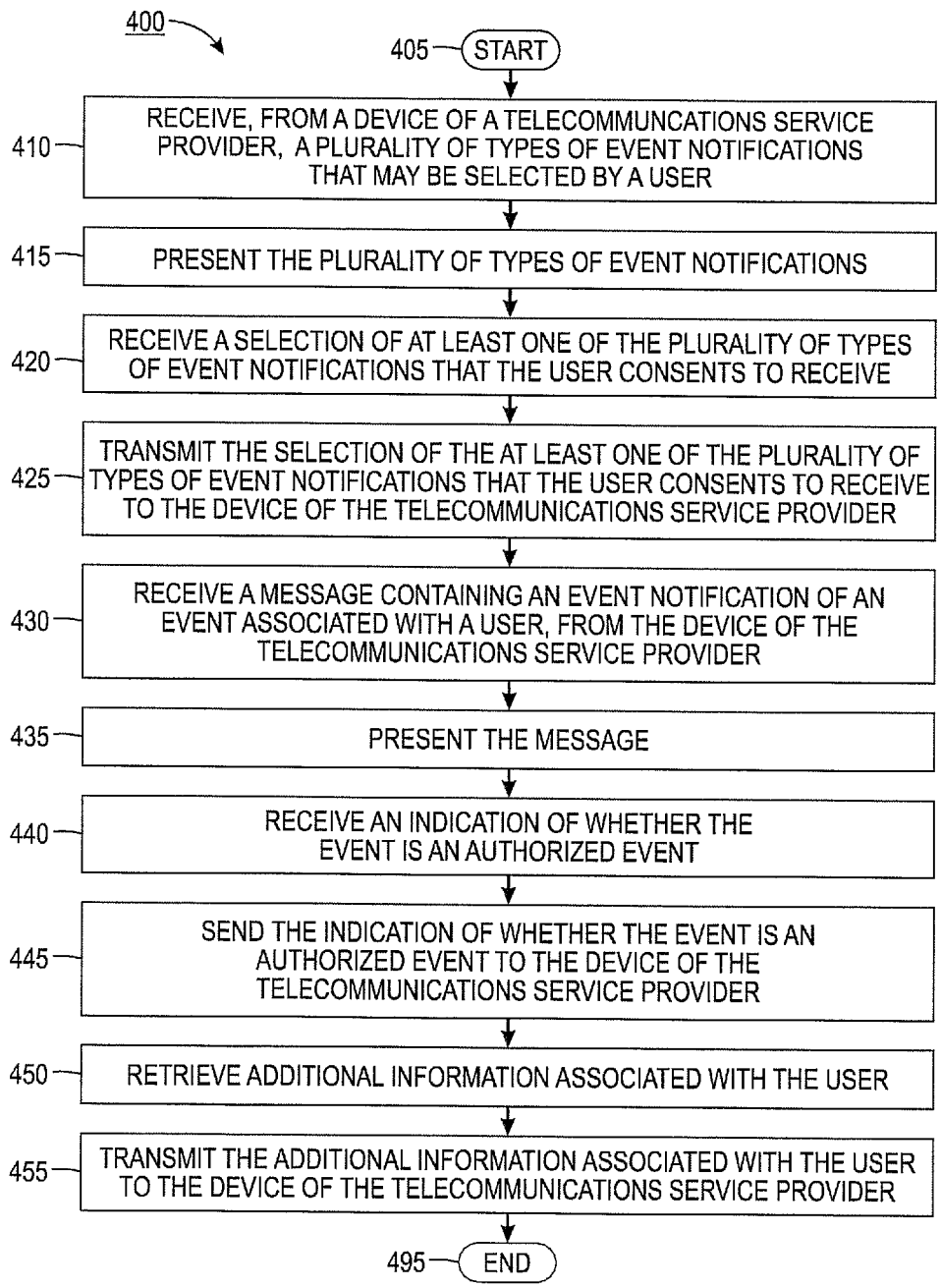
FIG. 4 illustrates an example flowchart of an additional method for processing event notifications, in accordance with the present disclosure.

FIG. 4 illustrates an example flowchart of a method 400 for processing event notifications in accordance with the present disclosure. In one example, steps, functions and/or operations of the method 400 may be performed by an endpoint device or user device, e.g., any one of devices 111-113 or 121-123 in FIG. 1. In one example, the steps, functions, or operations of method 400 may be performed by a computing device or system 500, and/or processor 502 as described in connection with FIG. 5 below. For illustrative purposes, the method 400 is described in greater detail below in connection with an example performed by a processor, such as processor 502. The method begins in step 405 and proceeds to step 410.

At step 410, the processor receives from a device of a telecommunications service provider (broadly a network service provider) a plurality of types of event notifications that may be selected by a user. For instance, the processor may connect to the device of the telecommunications service provider for the purpose of a user of the device selecting to receive event notifications from one or more different service providers and/or for one or more different types of event notifications.

At step 415, the processor presents the plurality of types of event notifications. For instance, the processor may comprise a processor of a mobile phone/smartphone of the user, a processor of a personal computer of the user, and so on. Thus, for example, the processor may present the plurality of types of event notifications via a graphical user interface on a display of such a device.

At step 420, the processor receives a selection of at least one of the plurality of types of event notifications that the user consents to receive. In one example, the selection may be indicated by the user checking boxes, clicking on links associated with respective types of event notifications and/or respective service providers, and so on.

At step 425, the processor transmits the selection of the at least one of the plurality of types of event notifications that the user consents to receive to the device of the telecommunications service provider.

At step 430, the processor receives from the device of the telecommunications service provider a message containing an event notification of an event associated with the user. In one example, the message in a unified message format may include the event notification, which may comprise text, audiovisual information, such as a map, and so forth, in addition to two response choices.

At step 435, the processor presents the message. For example, as mentioned above, the processor may comprise the processor of a mobile phone/smartphone of the user, a processor of a personal computer of the user, and so on. Thus, for example, the processor may present the message via a graphical user interface on a display of such a device. Alternatively, or in addition, the message may have an audio format. As such, at step 435 the processor may cause the message to be presented via a headset or speaker of a device in which the processor is deployed.

At step 440, the processor receives an indication of whether the event is an authorized event. In one example, the indication may be received by receiving a user input tapping or clicking a button comprising one of the two unified possible response choices, e.g., a button for "It's Me" and a button for "Not Me." The indication may take other forms such as pressing "1" or "2" on a keypad to indicate "It's Me" or "Not Me," respectively, or by texting a response message containing the text "1" or "2," to provide the same indications.

At step 445, the processor sends the indication of whether the event is an authorized event to the device of the telecommunication service provider.

At step 450, the processor retrieves additional information associated with the user. In one example, the processor retrieves additional information associated with the user that the user has specifically authorized to be shared in connection with processing event notifications. For instance, the processor may retrieve calendar information of the user. Alternatively, or in addition, the processor may retrieve location tracking information of the user. For example, the processor may comprise a processor of the user's mobile device which may store a history of recent locations of the mobile device. The processor may also retrieve credit card or account usage information of the user. For example, the processor may comprise a processor of the user's mobile device, where the mobile device may support tap-to-pay transactions linked to a credit card or other account of the user. In still another example, the additional information may comprise an image that may be captured at a time that an indication of whether the event is an authorized event is received, e.g., at the same time as step 440. For instance, the processor may cause a camera of a device in which the processor is deployed to capture an image of a person tapping a button to provide the indication.

At step 455, the processor transmits the additional information associated with the user to the device of the telecommunications service provider. In one example, the telecommunications service provider may use this additional information to provide a qualifier to the indication of whether the event is an authorized event. For instance, the telecommunications service provider may verify whether a captured image matches a stored image of a face of the user. Following step 455, the method 400 proceeds to step 495 where the method ends.

It should be noted that although not specifically specified, one or more steps, functions or operations of the respective methods 300 and 400 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 3 or FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described method 400 may comprise optional steps, or can be combined, separated, and/or performed in a different order from that described above, without departing from the example embodiments of the present disclosure.

As such, the present disclosure provides at least one advancement in the technical field of processing event notifications. For instance, examples of the present disclosure include a network-based server providing an additional layer of security for various types of events. For instance, in examples of the present disclosure a network-based server may provide an additional factor in a multi-factor authentication process for gaining access to a device or file, for authorizing the use of credit card at a point of sale terminal or in an online transaction, for allowing authorized entry to a premises, and so forth. In addition, examples of the present disclosure provide for customers/users to streamline and aggregate event notifications from various service providers into a single point of contact, e.g., a network-based server for processing event notifications, and to receive and respond to messages containing event notifications in a unified messaging format, e.g., having a same unified two-choices for response, regardless of the type of event notification, regardless of the service provider generating the event notification, and regardless of the device of the user on which an event notification message is received. Finally, embodiments of the present disclosure improve the functioning of a computing device, e.g., a server and/or a user endpoint device. Namely, a server or endpoint device dedicated for processing event notifications is improved.

Figure 5:
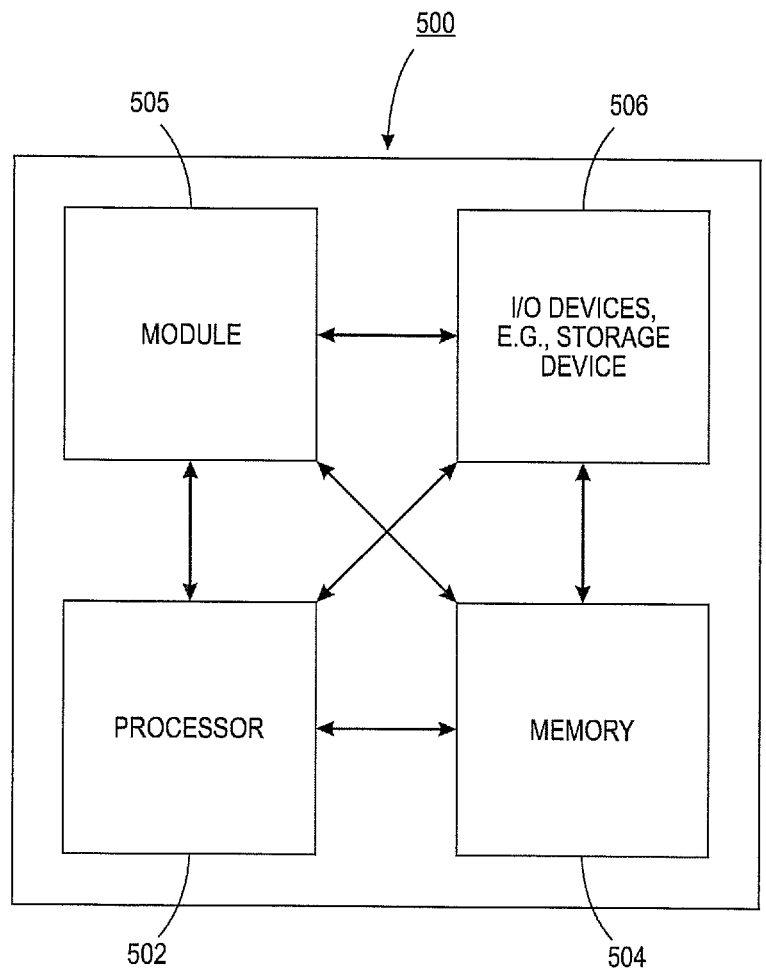
FIG. 5 illustrates an example high-level block diagram of a computer specifically programmed to perform the steps, functions, blocks, and/or operations described herein.

FIG. 5 depicts a high-level block diagram of a computing device suitable for use in performing the functions described herein. As depicted in FIG. 5, the system 500 comprises one or more hardware processor elements 502 (e.g., a central processing unit (CPU), a microprocessor, or a multi-core processor), a memory 504 (e.g., random access memory (RAM) and/or read only memory (ROM)), a module 505 for processing event notifications, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 or the method 400 as discussed above is implemented in a distributed or parallel manner for a particular illustrative example, i.e., the steps of the above method 300 or method 400, or the entire method 300 or method 400 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300 or method 400. In one embodiment, instructions and data for the present module or process 505 for processing event notifications (e.g., a software program comprising computer-executable instructions) can be loaded into memory 504 and executed by hardware processor element 502 to implement the steps, functions or operations as discussed above in connection with the illustrative method 300 or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for processing event notifications (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
receiving, by a processor of a telecommunications network operated by a network service provider, a first event notification of a first event from a device of a first service provider that is providing a service to a user, wherein the network service provider is distinct from the first service provider;
determining, by the processor, that the first service provider and the first event are of a type of service provider and a type of event, respectively, that the user has consented to receive the first event notification;
sending, by the processor, a message in a unified message format to a device of the user, the message comprising the first event;
receiving, by the processor, a response from the device of the user containing a first indication of whether the first event is an authorized event;
sending, by the processor, the first indication of whether the first event is an authorized event to the device of the first service provider;
receiving, by the processor, a second event notification of a second event, from a device of a second service provider, wherein the network service provider is distinct from the second service provider;
determining, by the processor, whether the second event is an authorized event based upon the response from the device of the user containing the first indication of whether the first event is an authorized event; and
sending, by the processor, a second indication of whether the second event is an authorized event to the device of the second service provider.

2. The method of claim 1, wherein the message in the unified message format comprises two unified response choices, wherein a first response choice of the two unified response choices is for confirming the first event is an authorized event, wherein a second response choice of the two unified response choices is for indicating that the first event is not an authorized event, and wherein the response comprises a selection of one of the two unified response choices.

3. The method of claim 1, further comprising:
receiving, by the processor, a selection of a plurality of types of events that the user consents to receive.

4. The method of claim 1, further comprising:
receiving, by the processor, a registration from the device of the first service provider to send event notifications to the user, wherein the registration comprises one of a plurality of registrations from a plurality of different service providers.

5. The method of claim 1, further comprising:
determining, by the processor, that the second event is of the type of event that the user has consented to receive the second event notification.

6. The method of claim 1, further comprising:
receiving, by the processor, additional information associated with the user; and
sending, by the processor, a qualifier to the first indication of whether the event is the authorized event to the device of the first service provider, wherein the qualifier is based upon the additional information.

7. The method of claim 6, wherein the additional information comprises schedule information of the user and wherein the qualifier comprises a notation that the first indication of whether the first event is the authorized event is potentially fraudulent, when the first indication of whether the first event is the authorized event indicates that the first event is the authorized event, and when the schedule information indicates that the user is scheduled to be at a location that is different from a location of the first event.

8. The method of claim 6, wherein the additional information comprises biometric information of the user and wherein the qualifier comprises a notation that the first indication of whether the first event is the authorized event is potentially fraudulent, when the first indication of whether the first event is the authorized event indicates that the first event is the authorized event and when the biometric information indicates that a physical property of the user exceeds a threshold.

9. The method of claim 8, wherein the physical property of the user comprises a heart rate of the user.

10. The method of claim 6, wherein the additional information comprises presence information of the user and wherein the qualifier comprises a notation that the first indication of whether the first event is the authorized event is potentially fraudulent, when the first indication of whether the first event is the authorized event indicates that the first event is the authorized event and when the presence information indicates that the user is at a location that is different from a location of the first event.

11. The method of claim 10, wherein the presence information is received from a device that is different from the device of the user.

12. The method of claim 6, wherein the additional information comprises an image of a face of a person captured via a camera of the device of the user in connection with the receiving the response from the device of the user containing the first indication of whether the first event is the authorized event.

13. The method of claim 12, wherein the qualifier comprises a notation that the first indication of whether the first event is the authorized event is potentially fraudulent, when the first indication of whether the first event is the authorized event indicates that the first event is the authorized event and when the image of the face of the person does not match a stored image of the face of the user.

14. The method of claim 12, wherein the qualifier comprises a notation that the first indication of whether the first event is the authorized event is potentially fraudulent, when the image of the face of the person matches a stored image of the face of the user and is indicative of a state of duress.

15. The method of claim 1, wherein the first service provider comprises:
a merchant;
a credit card service provider;
a banking service provider;
a network-based storage service provider; or
a premises security service provider.

16. The method of claim 1, wherein the first event comprises one of:
an in-store purchase transaction;
an automated teller machine transaction;
an online financial transaction;
a premises security device event;
a network-based data storage access event; or
a multimedia service usage event.

17. The method of claim 1, wherein the determining whether the second event is an authorized event based upon the response from the device of the user containing the first indication of whether the first event is an authorized event comprises:
determining, by the processor, that the second service provider and the second event are of the type of event and the type of service provider that the user have consented to receive the second event notification;
the method further comprising:
sending, by the processor, another message in the unified message format to the device of the user comprising the second event, where a format of the first event notification and a format of the second event notification are different.

18. A non-transitory computer-readable storage medium storing instructions which, when executed by a processor of a telecommunications network operated by a network service provider, cause the processor to perform operations, the operations comprising:
receiving a first event notification of a first event from a device of a first service provider that is providing a service to a user, wherein the network service provider is distinct from the first service provider;
determining that the first service provider and the first event are of a type of service provider and a type of event, respectively, that the user has consented to receive the first event notification;
sending a message in a unified message format to a device of the user, the message comprising the first event;
receiving a response from the device of the user containing a first indication of whether the first event is an authorized event;
sending the first indication of whether the first event is an authorized event to the device of the first service provider;
receiving a second event notification of a second event, from a device of a second service provider, wherein the network service provider is distinct from the second service provider;
determining whether the second event is an authorized event based upon the response from the device of the user containing the first indication of whether the first event is an authorized event; and sending a second indication of whether the second event is an authorized event to the device of the second service provider.

19. A device comprising:

a processor of a telecommunications network operated by a network service provider; and a non-transitory computer-readable medium storing instructions which, when executed by the processor, cause the processor to perform operations, the operations comprising:

receiving a first event notification of a first event from a device of a first service provider that is providing a service to a user, wherein the network service provider is distinct from the first service provider;

determining that the first service provider and the first event are of a type of service provider and a type of event, respectively, that the user has consented to receive the first event notification;

sending a message in a unified message format to a device of the user, the message comprising the first event;

receiving a response from the device of the user containing a first indication of whether the first event is an authorized event;

sending the first indication of whether the first event is an authorized event to the device of the first service provider;

receiving a second event notification of a second event, from a device of a second service provider, wherein the network service provider is distinct from the second service provider;

determining whether the second event is an authorized event based upon the response from the device of the user containing the first indication of whether the first event is an authorized event; and sending a second indication of whether the second event is an authorized event to the device of the second service provider.

20. The device of claim 19, wherein the message in the unified message format comprises two unified response choices, wherein a first response choice of the two unified response choices is for confirming the first event is an authorized event, wherein a second response choice of the two unified response choices is for indicating that the first event is not an authorized event, and wherein the response comprises a selection of one of the two unified response choices.

* * * * *